US012627410B2

(12) United States Patent
Zhang et al.

(10) Patent No.: US 12,627,410 B2
(45) Date of Patent: May 12, 2026

(54) REPETITION ACROSS SLOT BOUNDARY HANDLING

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 17/307,690

(22) Filed: May 4, 2021

(65) Prior Publication Data

US 2022/0360368 A1 Nov. 10, 2022

(51) Int. Cl.
| | |
|---|---|
| *H04L 1/18* | (2023.01) |
| *H04L 5/14* | (2006.01) |
| *H04W 72/0446* | (2023.01) |
| *H04W 72/21* | (2023.01) |
| *H04W 72/23* | (2023.01) |

(52) U.S. Cl.
CPC ................. *H04L 1/18* (2013.01); *H04L 5/14* (2013.01); *H04W 72/0446* (2013.01); *H04W 72/21* (2023.01); *H04W 72/23* (2023.01)

(58) Field of Classification Search
CPC . H04L 1/18; H04L 5/14; H04L 1/1887; H04L 1/189; H04L 5/0044; H04L 1/08; H04W 72/0446; H04W 72/1284; H04W 72/1289; H04W 72/21; H04W 72/23
See application file for complete search history.

(56) References Cited

U.S. PATENT DOCUMENTS

| | | | | |
|---|---|---|---|---|
| 12,127,169 | B2 * | 10/2024 | Wang | H04L 1/1822 |
| 2017/0290001 | A1 * | 10/2017 | Axmon | H04W 72/0446 |
| 2018/0205512 | A1 * | 7/2018 | You | H04L 5/0048 |
| 2018/0263061 | A1 * | 9/2018 | Moroga | H04L 1/189 |
| 2018/0279268 | A1 * | 9/2018 | You | H04W 72/23 |
| 2020/0314875 | A1 * | 10/2020 | Fakoorian | H04L 1/189 |
| 2021/0051652 | A1 * | 2/2021 | Khoshnevisan | H04L 1/189 |
| 2021/0051669 | A1 * | 2/2021 | Lin | H04L 1/189 |
| 2021/0297126 | A1 * | 9/2021 | Cao | H04B 7/0696 |
| 2022/0104224 | A1 * | 3/2022 | Choi | H04L 1/1812 |
| 2022/0132555 | A1 * | 4/2022 | Blankenship | H04W 72/23 |
| 2022/0200759 | A1 * | 6/2022 | Yoshioka | H04L 1/08 |
| 2022/0231789 | A1 * | 7/2022 | Ying | H04L 1/1854 |
| 2022/0256566 | A1 * | 8/2022 | Gao | H04L 1/189 |
| 2022/0312483 | A1 * | 9/2022 | Bae | H04L 1/189 |
| 2022/0322447 | A1 * | 10/2022 | Fakoorian | H04L 1/08 |
| 2022/0369297 | A1 * | 11/2022 | Takahashi | H04W 72/0446 |
| 2022/0377767 | A1 * | 11/2022 | Ying | H04W 72/23 |

(Continued)

*Primary Examiner* — Chirag G Shah
*Assistant Examiner* — Joshua Smith
(74) *Attorney, Agent, or Firm* — Dinsmore & Shohl-Qualcomm

(57) ABSTRACT

Aspects of the present disclosure relate to wireless communications, and more particularly, to techniques for channel repetition. One aspect provides a method for wireless communication by a user-equipment (UE). The method generally includes receiving a message scheduling a downlink (DL) transmission, an uplink (UL) transmission, and a repetition of at least one of the DL transmission or the UL transmission, and communicating with at least one wireless node in accordance with the scheduling by the message.

22 Claims, 12 Drawing Sheets

(56)  References Cited

U.S. PATENT DOCUMENTS

| | | | |
|---|---|---|---|
| 2023/0048329 A1* | 2/2023 | Kang | H04W 72/23 |
| 2023/0085606 A1* | 3/2023 | Shao | H04L 1/08 |
| | | | 370/329 |
| 2023/0102651 A1* | 3/2023 | Takahashi | H04L 1/08 |
| | | | 370/329 |
| 2023/0123957 A1* | 4/2023 | Jung | H04L 1/08 |
| | | | 370/329 |
| 2023/0140213 A1* | 5/2023 | Awadin | H04L 1/189 |
| | | | 370/329 |
| 2023/0156674 A1* | 5/2023 | Yao | H04L 1/08 |
| | | | 370/280 |
| 2023/0209542 A1* | 6/2023 | Wang | H04W 72/23 |
| | | | 370/329 |

* cited by examiner

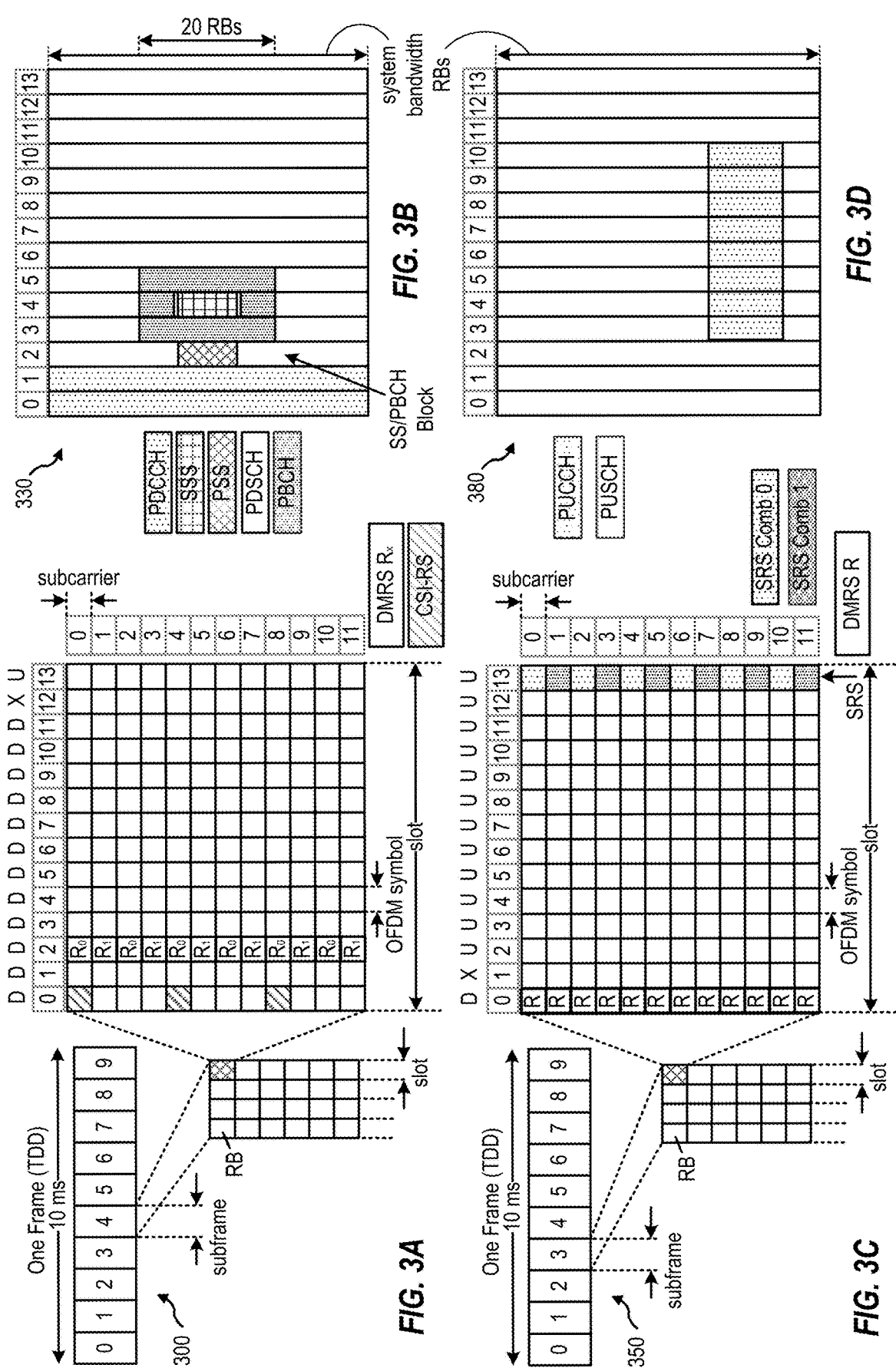

Self-Interference from DL to UL

Interference from gNB

400A

404

Downlink    BS1

408

410   Uplink

BS2

414

402

Interference to UE1

406

UE1       UE2

400B

408

Downlink    BS1

404

414

420

Uplink

BS2

402

406

Interference to UE1

UE1      UE2

Self-Interference from UL to DL

400C

404

414

432

Uplink    BS1

BS2

430

402

406

UE1      UE2

Self-Interference from UL to DL

700

A METHOD FOR WIRELESS COMMUNICATION BY A BASE STATION (BS)

710

TRANSMIT A MESSAGE SCHEDULING A DOWNLINK (DL) TRANSMISSION, AN UPLINK (UL) TRANSMISSION, AND A REPETITION OF AT LEAST ONE OF THE DL TRANSMISSION OR THE UL TRANSMISSION

720

COMMUNICATE WITH A USER-EQUIPMENT (UE) IN ACCORDANCE WITH THE SCHEDULING BY THE MESSAGE

800

A METHOD FOR WIRELESS COMMUNICATION BY A USER-EQUIPMENT (UE)

810

RECEIVE A MESSAGE SCHEDULING A DOWNLINK (DL) TRANSMISSION, AN UPLINK (UL) TRANSMISSION, AND A REPETITION OF AT LEAST ONE OF THE DL TRANSMISSION OR THE UL TRANSMISSION

820

COMMUNICATE WITH AT LEAST ONE WIRELESS NODE IN ACCORDANCE WITH THE SCHEDULING BY THE MESSAGE

1200

1210

1208

Transceiver

1202

Processing System

1206

1220

Processor(s)

1230

Computer-Readable
Medium/Memory

1221

Circuitry for transmitting

1231

Code for transmitting

1222

Circuitry for receiving

1232

Code for receiving

1221

Circuitry for communciating

1233

Code for communicating

REPETITION ACROSS SLOT BOUNDARY HANDLING

INTRODUCTION

Aspects of the present disclosure relate to wireless communications, and more particularly, to techniques for channel repetition.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a user-equipment (UE). The method generally includes receiving a message scheduling a downlink (DL) transmission, an uplink (UL) transmission, and a repetition of at least one of the DL transmission or the UL transmission, and communicating with at least one wireless node in accordance with the scheduling by the message.

Another aspect provides an apparatus for wireless communication by a UE. The apparatus generally includes means for receiving a message scheduling a DL transmission, a UL transmission, and a repetition of at least one of the DL transmission or the UL transmission, and means for communicating with at least one wireless node in accordance with the scheduling by the message.

Another aspect provides an apparatus for wireless communication by a UE. The apparatus generally includes: a memory comprising executable instructions; and one or more processors configured to execute the executable instructions and cause the apparatus to receive a message scheduling a DL transmission, a UL transmission, and a repetition of at least one of the DL transmission or the UL transmission, and communicate with at least one wireless node in accordance with the scheduling by the message.

Another aspect provides a non-transitory computer-readable medium comprising executable instructions that, when executed by one or more processors of a UE, cause the UE to receive a message scheduling a DL transmission, a UL transmission, and a repetition of at least one of the DL transmission or the UL transmission, and communicate with at least one wireless node in accordance with the scheduling by the message.

Another aspect provides a method for wireless communication by a base station (BS). The method generally includes transmitting a message scheduling a DL transmission, a UL transmission, and a repetition of at least one of the DL transmission or the UL transmission, and communicating with a UE in accordance with the scheduling by the message.

Another aspect provides an apparatus for wireless communication by a BS. The apparatus generally includes means for transmitting a message scheduling a DL transmission, a UL transmission, and a repetition of at least one of the DL transmission or the UL transmission, and means for communicating with a UE in accordance with the scheduling by the message.

Another aspect provides an apparatus for wireless communication by a BS. The apparatus generally includes a memory comprising executable instructions; and one or more processors configured to execute the executable instructions and cause the apparatus to transmit a message scheduling a DL transmission, a UL transmission, and a repetition of at least one of the DL transmission or the UL transmission, and communicate with a UE in accordance with the scheduling by the message.

Another aspect provides a non-transitory computer-readable medium comprising executable instructions that, when executed by one or more processors of a BS, cause the BS to transmit a message scheduling a DL transmission, a UL transmission, and a repetition of at least one of the DL transmission or the UL transmission, and communicate with a UE in accordance with the scheduling by the message.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for communication of repetitions for uplink (UL) and (DL) transmissions. In some cases, repetitions for UL and DL transmissions may be configured, and one or more of the repetitions may be transmitted using full-duplex (FD) mode. Some aspects of the present disclosure are directed to techniques for scheduling repetitions in a manner that allows for greater flexibility in configuring the repetitions compared to conventional implementations, thereby increasing resource utilization. Using FD mode reduces latency and increases spectrum efficiency by allowing simultaneous data reception and transmission.

For example, a base station (BS) may configure a repetition for the UL transmission or the DL transmission such that the transmission of the repetition crosses a slot boundary. The BS may also configure the repetition not to cross the slot boundary. In other words, a repetition that would otherwise cross the slot boundary may instead be scheduled as two repetitions in different slots with a gap between the repetitions. In some aspects, a BS may schedule repetitions with different durations or may configure a different quantity of repetitions for the UL transmission as compared to the DL transmission.

Introduction to Wireless Communication Networks

Figure 1:
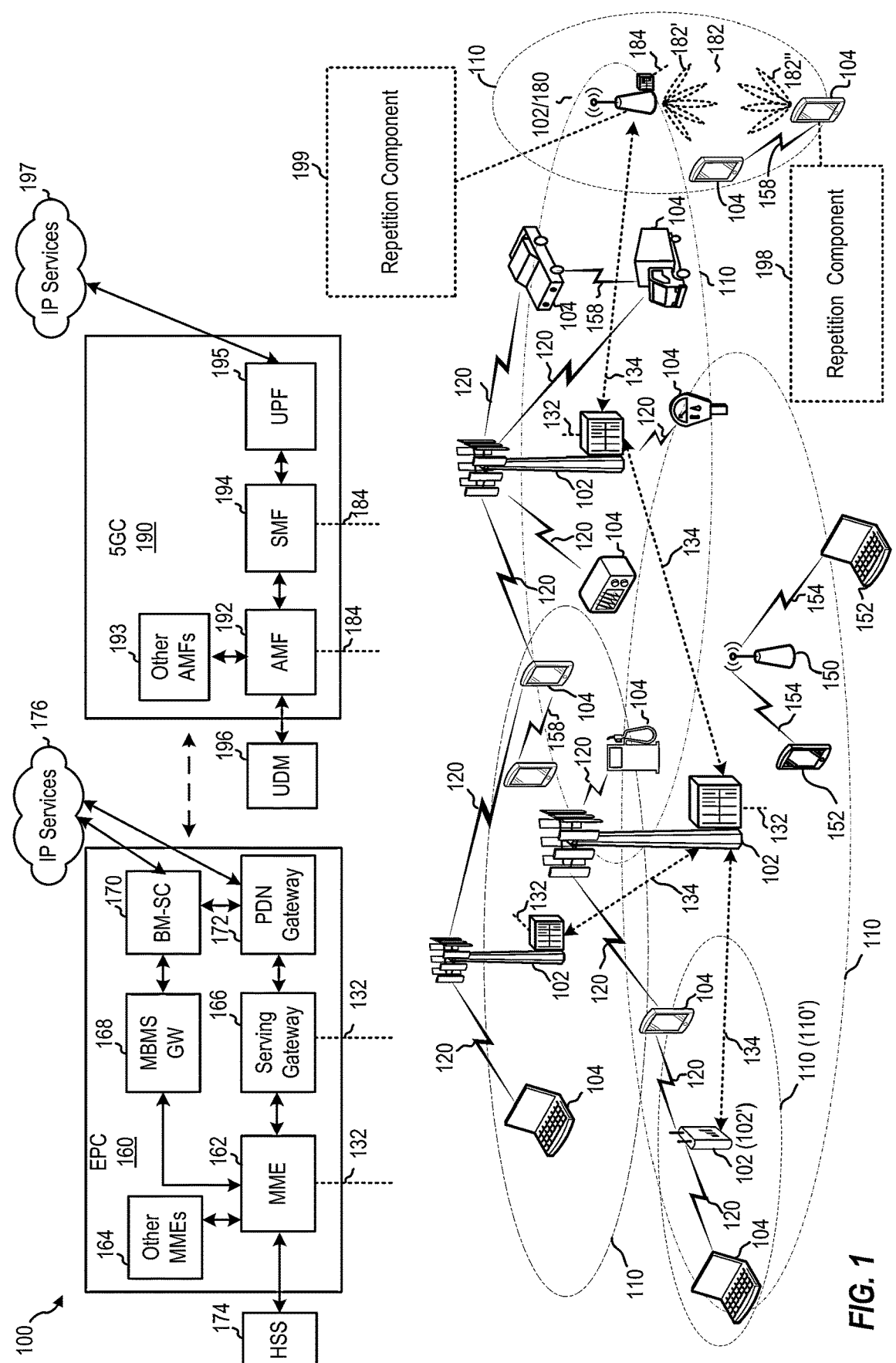
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes a repetition component 199, which may be configured to schedule UL and DL transmissions and a repetition for the UL transmission or the DL transmission. Wireless network 100 further includes a repetition component 198, which may be used configured to receive scheduling of UL and DL transmissions and a repetition for the UL transmission or the DL transmission.

Figure 2:
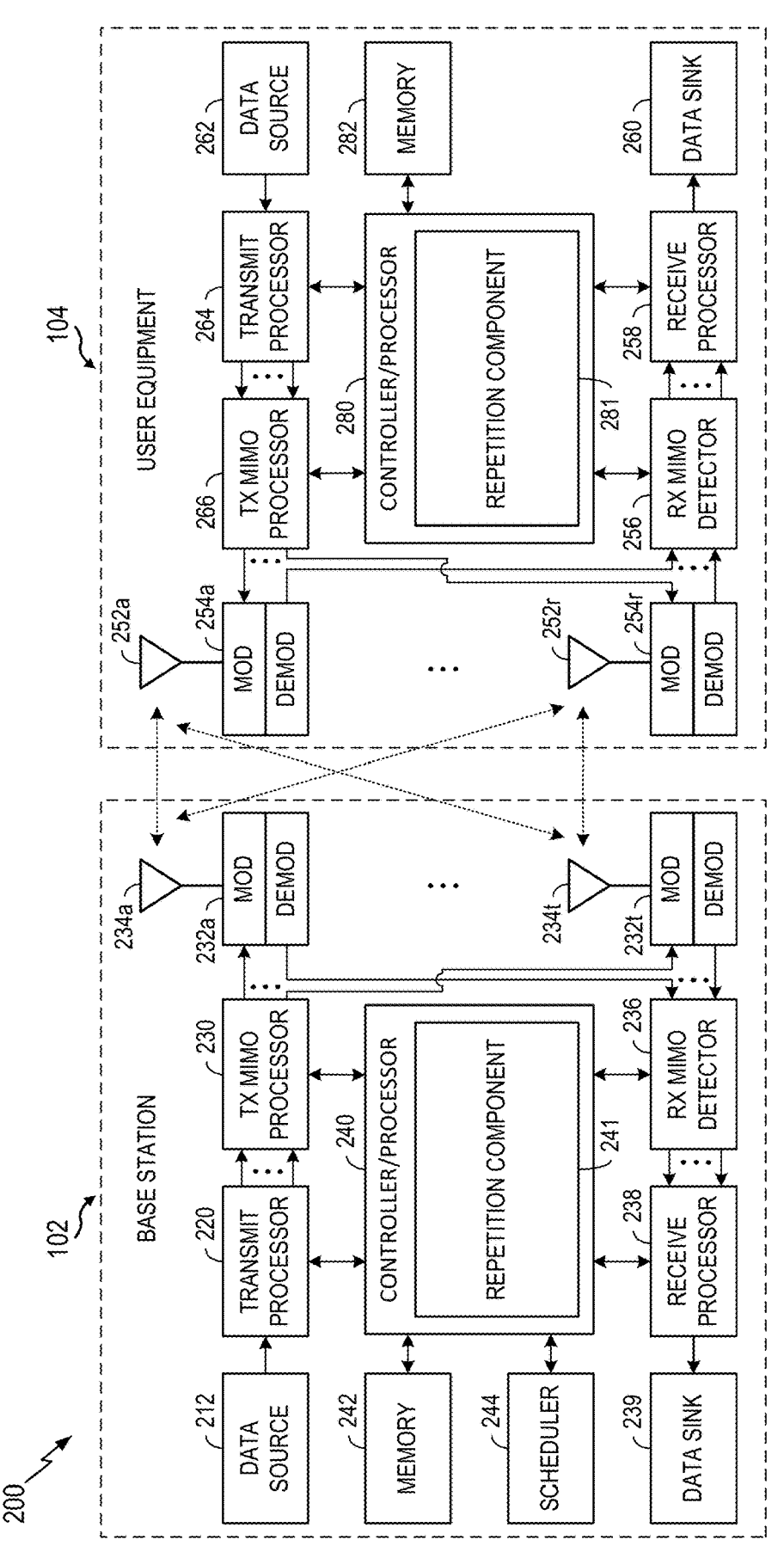
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes a repetition component 241, which may be representative of the repetition component 199 of FIG. 1. Notably, while depicted as an aspect of controller/processor 240, the repetition component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 102 includes controller/processor 280, which may be configured to implement various functions related to wireless communications. In the depicted example, controller/processor 280 includes the repetition component 281, which may be representative of the repetition component 198 of FIG. 1. Notably, while depicted as an aspect of controller/processor 280, the repetition component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Example Full-Duplex Communication

Certain aspects of the present disclosure are directed to techniques for implementing full-duplex (FD) communication (also referred to herein as "FD mode"). FD communication generally refers to simultaneous transmission and reception of signals (e.g., uplink (UL) and downlink (DL) transmissions). The simultaneous UL/DL transmissions may be in FR2, as described above.

FD capability may be present at either a base station (BS), a user equipment (UE), or both. For instance, at the UE, UL may be via one antenna panel and DL reception may be via another antenna panel. Similarly, at the BS, UL may be via one antenna panel (e.g., at one transmission-reception point (TRP)) and DL reception may be via another antenna panel (e.g., at another TRP).

FD capability may be conditional on beam separation to reduce self-interference between DL and UL and clutter echo (e.g., due to objects causing reflection of signaling). FD communication facilitates latency reduction by allowing reception of DL signal in UL only slots, or UL signal in DL only slots. FD communication also provides spectrum efficiency enhancements per cell and per UE, and provides more efficient resource utilization.

Figures 4A, 4B, 4C:
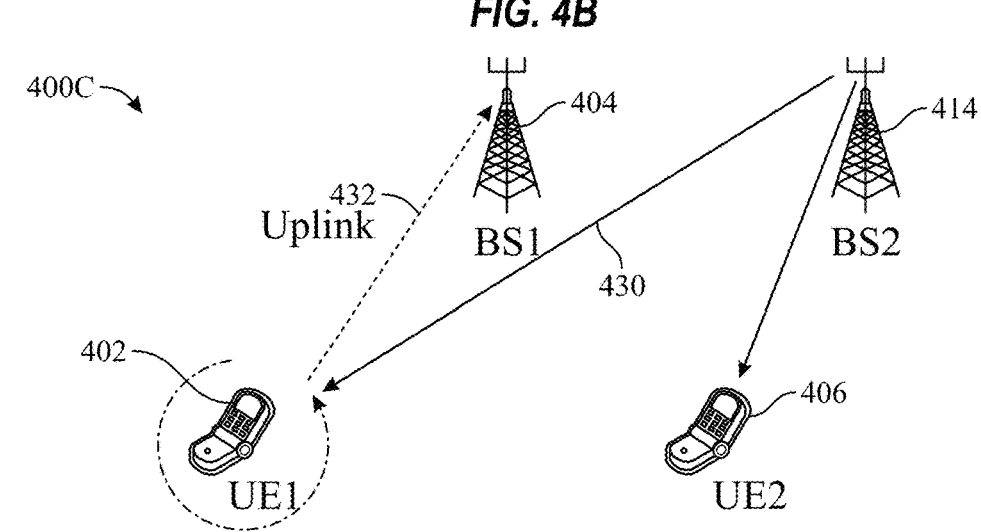
FIGS. 4A-4C are diagrams of example full-duplex communication deployments.

FIGS. 4A-4C are diagrams of example FD communication deployments. FIG. 4A illustrates a deployment 400A including a full-duplex (FD) BS and a half-duplex (HD) UE. As illustrated, a UE 402 (e.g., HD UE) may receive a DL transmission 408 from a BS 404 (e.g., FD BS), while another UE 406 may send an UL transmission 410 to the same BS 404. The UL transmission 410 and the DL transmission 408 may overlap in the time domain. The BS 404, operating in a FD mode, may thus experience self-interference from the DL transmission 408 to the reception by the BS of the UL transmission 410. Further, as shown, UE 402 may experience interference from UE 406 and another BS 414, and BS 404 may experience interference from BS 414.

FIG. 4B illustrates a deployment 400B including a FD BS and a FD UE. As illustrated, UE 402 may receive a DL transmission 408 from BS 404 and send an UL transmission 420 to the same BS 404. Thus, both UE 402 and BS 404 are operating in FD mode. UE 402 may thus experience self-interference from UL transmission 420 to the reception by the UE of DL transmission 408. In other words, the UL transmission 420 may cause interference and prevent proper reception and decoding of the DL transmission 408. Further, as shown, UE 402 may experience interference from UE 406 and BS 414, while UE 406 is receiving DL transmissions from the BS 414.

FIG. 4C illustrates a deployment 400C including an FD UE with multi-transmission/reception point (TRP) communication. UE 402 may receive a DL transmission 430 from BS 414 and send an UL transmission 432 to BS 404. The DL transmission and the UL transmission 432 may overlap in the time-domain. Thus, the UE 402 may be operating in FD mode. The UE 402 may thus experience self-interference from the UL transmission 432 to the reception by the UE of DL transmission 430. In other words, the UL transmission 432 may cause interference and prevent proper reception and decoding of the DL transmission 430. Further, as shown, the UE 406 may receive DL transmissions from the BS 414.

Figure 5A:
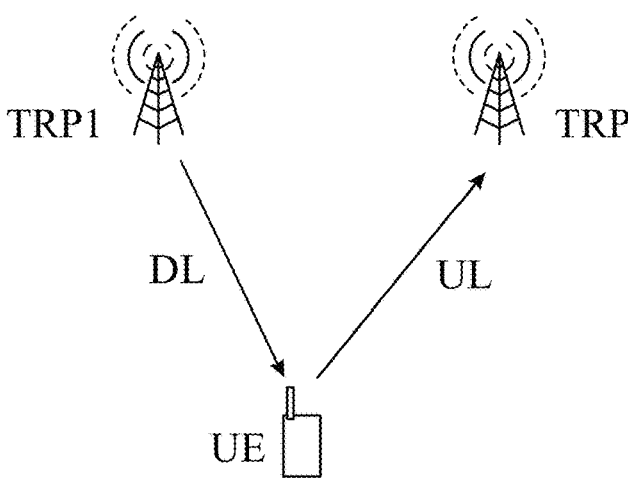
FIGS. 5A, 5B, and 5C illustrate example scenarios for communication between at least one user-equipment and at least one base station or transmission and reception point.
Figure 5B:
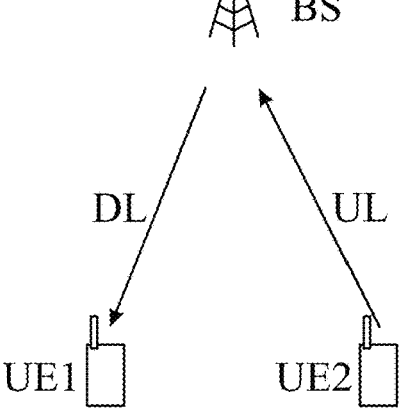
Figure 5C:
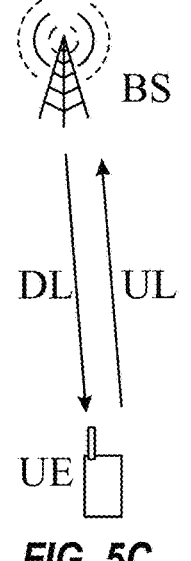

FIGS. 5A, 5B, and 5C illustrate example scenarios for communication between at least one UE and at least one base station (BS) or transmission and reception point (TRP). For example, as illustrated in FIG. 5A, a UE may be communicating using FD mode by simultaneously receiving signaling from TRP 1 on DL and transmitting signaling to TRP 2 on UL.

As illustrated in FIG. 5B, a BS may be communicating using FD. For instance, a BS may simultaneously transmit signaling to UE 1 on DL and receive signaling from UE 2 on UL.

As illustrated in FIG. 5C, both a UE and BS may be communicating using FD. For example, a BS may simultaneously transmit signaling to a UE and receive signaling from the same UE. Example use cases for each of the scenarios shown are provided herein. Various techniques for communication using FD mode are described in more detail with respect to FIG. 6.

Figure 6:
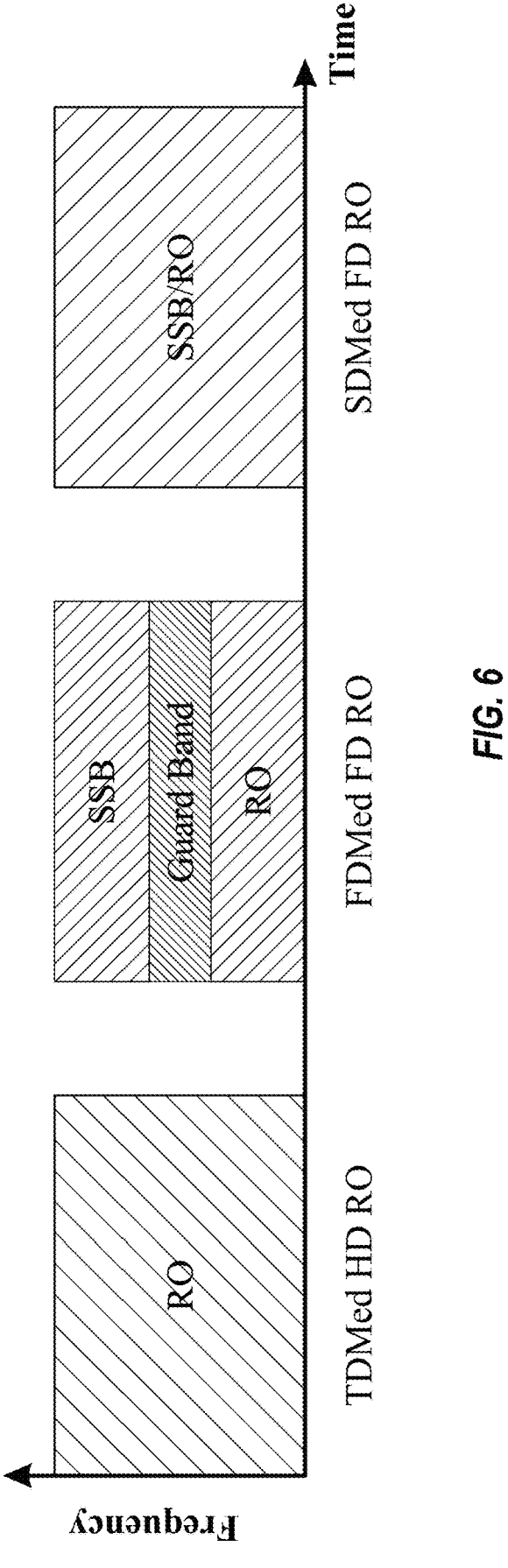
FIG. 6 illustrates example half-duplex and full-duplex communications.

FIG. 6 illustrates half-duplex (HD), as well as frequency division multiplexed (FDMed) FD, and spatial division multiplexed (SDMed) FD modes.

As illustrated, when using HD mode, a RACH occasion (RO) cannot overlap in time with DL transmissions, such as synchronization signal block (SSB), physical downlink control channel (PDCCH), physical downlink shared channel (PDSCH), channel state information (CSI)-reference signal (RS). Transmission during RO using HD mode may also be referred to as time division multiplexed (TDMed) RO type. TDMed RO type may have a longer access delay as compared to using FD mode of communication. For FD mode, RO may overlap in time with DL transmissions, such as SSB, PDCCH, PDSCH, etc., to enable a more efficient system and lower latency. For an FDMed RO type, the RO and DL transmissions may share the same time resources but at different or partially different frequency resources with a guard band in between the frequency resources, as shown. For SDMed RO type, RO and DL transmissions may share the same time and frequency resources, as shown.

Aspects Related to Repetition Across Slot Boundary

For slot aggregation, the same payload in downlink (DL) or uplink (UL) may be repeated in consecutive slots or mini-slots. As used herein, a repetition of a data transmission may include retransmission of the same data transmission or a redundancy version of the data transmission. That is, the same data may be encoded differently for the repetitions using different redundancy versions. A receiver may soft-combine the received aggregated slots (e.g., combine the transmissions across slots) to boost up signal to noise ratio (SNR). Slot aggregation may be used for any data channel, such as a physical uplink shared channel (PUSCH) or a physical downlink shared channel (PDSCH). Aggregated slots may be used to perform a beam sweep using different spatial beams (e.g., in FR2), offering improved diversity against blockages in the mmWave bands. In full-duplex (FD) mode, slot aggregation may be used for simultaneous DL and UL transmissions for better diversity. The BS may schedule DL and UL repetitions on different slots via same or different beam pairs.

Figure 7:
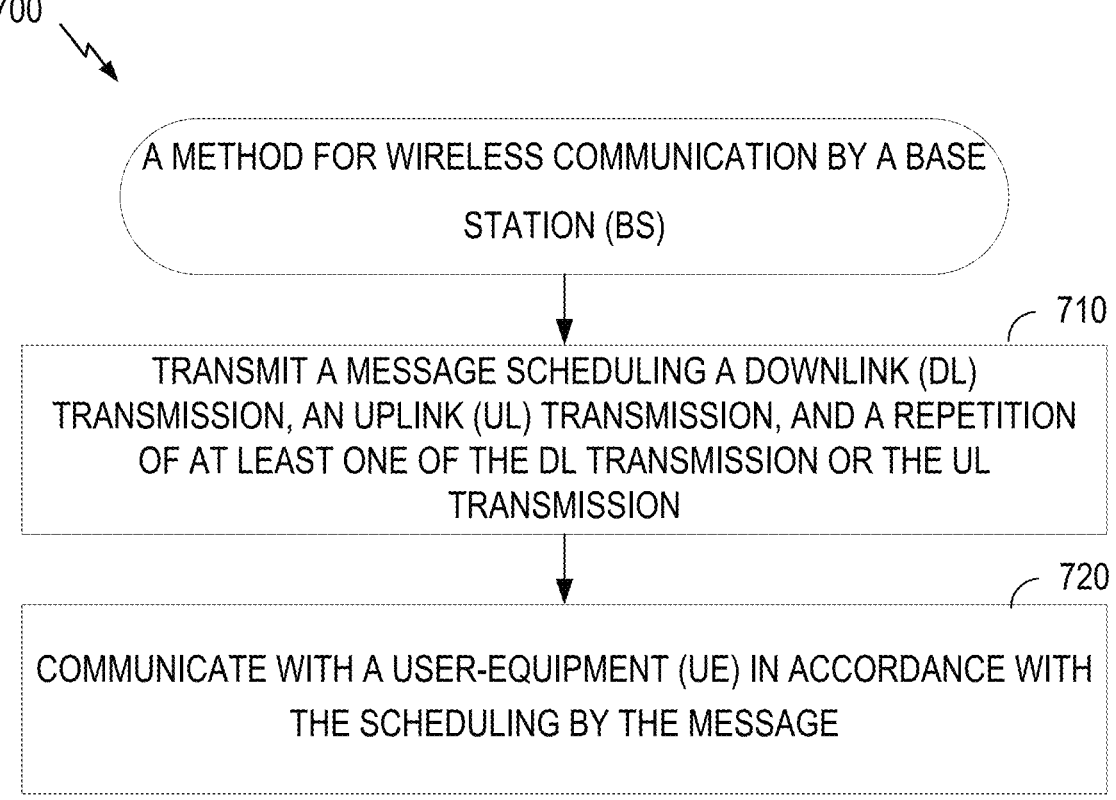
FIG. 7 is a flow diagram illustrating example operations for wireless communication by a base station, in accordance with certain aspects of the present disclosure.

FIG. 7 is a flow diagram illustrating example operations 700 for wireless communication, in accordance with certain aspects of the present disclosure. The operations 700 may be performed, for example, by a BS (e.g., such as the BS 110a in the wireless communication network 100 of FIG. 1).

Operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240 or repetition component 241 of FIG. 2) obtaining and/or outputting signals.

The operations 700 may begin, at block 710, by the BS transmitting a message scheduling a DL transmission, a UL transmission, and a repetition of at least one of the DL transmission or the UL transmission. In some aspects, the message may indicate whether the repetition of at least one of the DL transmission or the UL transmission spans across a slot boundary. For example, the message may indicate that the repetition of at least one of the DL transmission or the UL transmission spans across a slot boundary, or may indicate that the repetition of at least one of the DL transmission or the UL transmission does not span across a slot boundary.

At block 720, the BS may communicate with a user-equipment (UE) in accordance with the scheduling by the message. For example, the BS may communicate the DL and UL transmissions and the repetition of at least one of the DL transmission or the UL transmission.

In some aspects, the communicating may also include simultaneously communicating the repetition of the DL transmission and the repetition of the UL transmission using FD communication. In this case, the message may indicate that both the repetitions of the DL and UL transmissions span across a boundary between slots or that both the repetitions of the DL and UL transmissions do not span across the boundary between the slots. The communicating may also include communicating the repetitions for the DL transmission and the UL transmission using an UL and DL beam pair configured for the FD communication.

In some aspects, the communicating may also include communicating at least one of the DL transmission or the UL transmission using FD communication. In some aspects, the communicating may also include communicating at least one of the DL transmission or the UL transmission using half-duplex (HD) communication (also referred to herein as "HD mode").

In some aspects, the message schedules a first quantity of repetitions of the DL transmission and a second quantity of repetitions of the UL transmission, the first quantity of repetitions being different than the second quantity of repetitions. In some aspects, the message schedules a first duration for the repetition of the DL transmission and a second duration for the repetition of the UL transmission, the first duration being different than the second duration.

In certain aspects, the repetition of the DL transmission may be part of one or more repetitions of the DL transmission, and the repetition of the UL transmission may be part of one or more repetitions of the UL transmission. A first portion of the one or more repetitions of one of the DL and UL transmissions may be overlapping with the one or more repetitions of another one of the DL and UL transmissions. Moreover, the one or more repetitions of the DL and UL transmissions may use an UL and DL beam pair configured for FD communication during the first portion of the one or more repetitions. In some aspects, a second portion of the one or more repetitions of the one of the DL and UL transmissions may be non-overlapping with the one or more repetitions of the other one of the DL and UL transmissions. In one aspect, the one or more repetitions of DL transmission or the UL transmission may use a beam of the UL and DL beam pair during the second portion. In another aspects, the one or more repetitions of DL transmission or the UL transmission may use a beam different than the UL and DL beam pair during the second portion.

Figure 8:
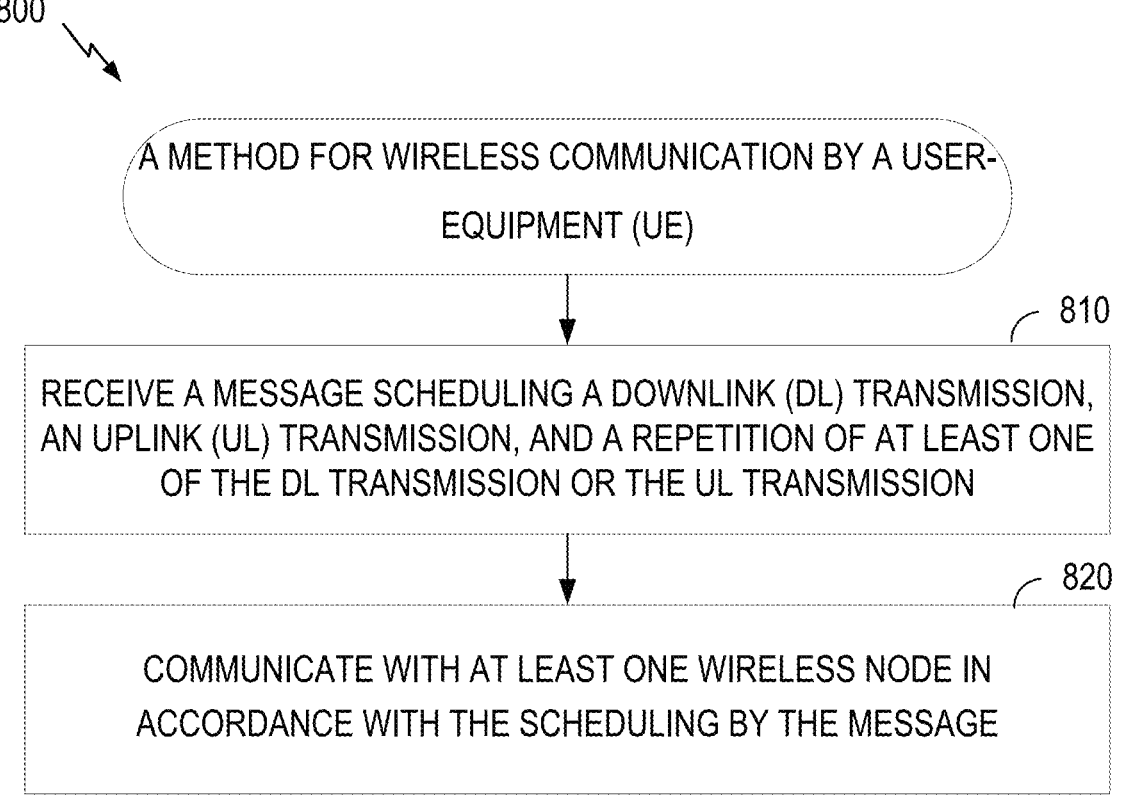
FIG. 8 is a flow diagram illustrating example operations for wireless communication by a user-equipment, in accordance with certain aspects of the present disclosure.

FIG. 8 is a flow diagram illustrating example operations 800 for wireless communication, in accordance with certain aspects of the present disclosure. The operations 800 may be performed, for example, by a UE (e.g., such as a UE 120a in the wireless communication network 100 of FIG. 1).

The operations 800 may be complementary operations by the UE to the operations 700 performed by the B S, as described with respect to FIG. 7. Operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280 or repetition component 281 of FIG. 2) obtaining and/or outputting signals.

The operations 800 may begin, at block 810, by the UE receiving a message scheduling a DL transmission and a UL transmission and a repetition of at least one of the DL transmission or the UL transmission.

In some aspects, the message may indicate whether the repetition of at least one of the DL transmission or the UL transmission spans across a slot boundary. For example, the message may indicate that the repetition of at least one of the DL transmission or the UL transmission spans across a slot boundary, or may indicate that the repetition of at least one of the DL transmission or the UL transmission does not span across a slot boundary. In some aspects, the message may indicate that the repetition for one of the DL and UL transmissions spans across a slot boundary and indicates that the repetition for another one of the DL or UL transmissions does not span across the slot boundary.

At block 820, the UE may communicate with at least one wireless node in accordance with the scheduling by the message. For example, the UE may communicate the DL and UL transmissions and the repetition of at least one of the DL transmission or the UL transmission.

In some aspects, the communicating may include simultaneously communicating the repetition of the DL transmission and the repetition of the UL transmission using FD communication (also referred to herein as "FD mode"). In this case, the messages may indicate that both the repetitions of the DL and UL transmissions span across a boundary between slots or that both the repetitions of the DL and UL transmissions do not span across the boundary between the slots. The communicating may also include communicating the repetitions for the DL transmission and the UL transmission using an UL and DL beam pair configured for the FD communication.

In some aspects, the communicating may include communicating at least one of the DL transmission or the UL transmission using FD communication, or communicating at least one of the DL transmission or the UL transmission using HD communication.

Figure 9A:
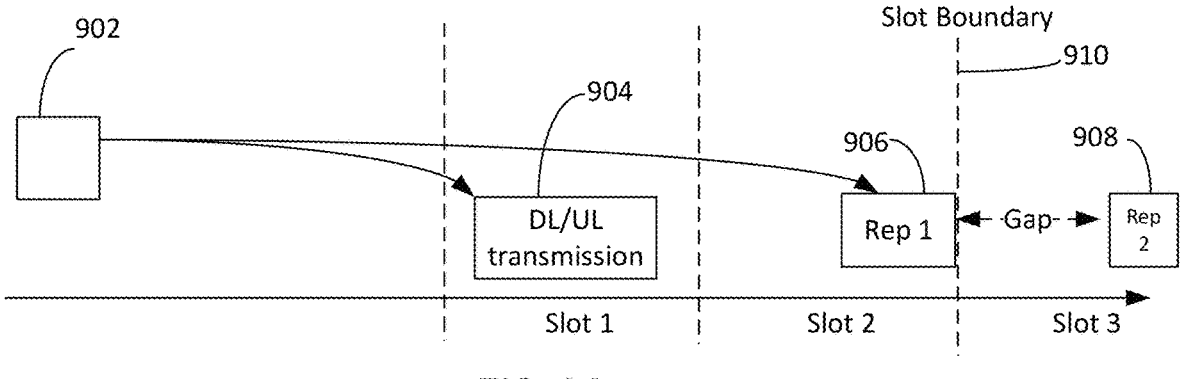
FIGS. 9A and 9B illustrate techniques for communication of repetitions for slot aggregation or sub-slot repetitions, in accordance with certain aspects of the present disclosure.
Figure 9B:
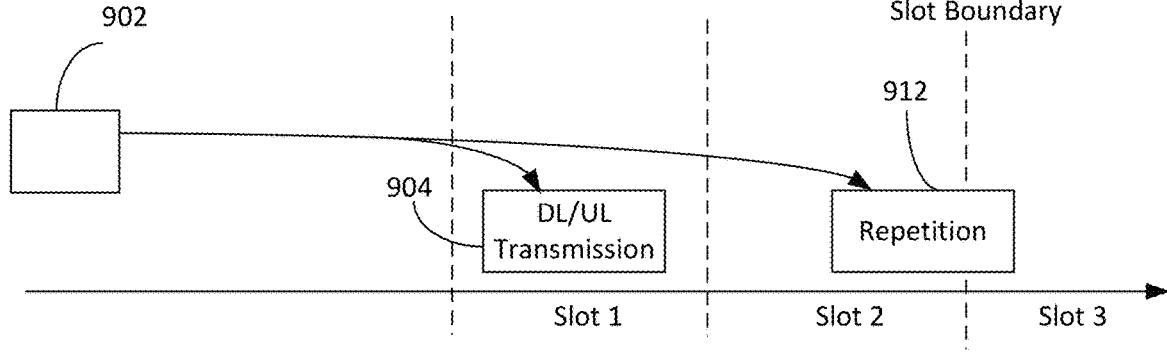

FIGS. 9A and 9B illustrate techniques for communication of repetitions across a slot boundary for slot aggregation or sub-slot repetitions, in accordance with certain aspects of the present disclosure.

For example, as shown, a message 902 (e.g., downlink control information (DCI) or radio resource control (RRC) message) may schedule a DL transmission and an UL transmission (e.g., collectively referred to as transmission 904) with repetitions for both the UL and DL transmissions. In some aspects, the message may schedule, per direction (e.g., separately for each of the UL and DL transmissions), the repetition such that the repetition does not cross a slot boundary. In other words, any transmission that spans across a slot boundary may be scheduled as two repetitions. That is, as shown in FIG. 9A, at least one repetition may be scheduled for the DL or UL transmission (or both).

As described, a repetition may not be scheduled across the slot boundary 910, in some implementations. Thus, the repetition for the DL or UL transmission may be configured as two repetitions 906, 908 with a gap between the repetitions. As shown, repetition 908 may have a smaller duration than repetition 906.

In some aspects, per direction (e.g., separately for UL repetition and DL repetition), the message 902 may schedule the repetition across a slot boundary. The scheduling of a repetition may be performed separately for UL repetitions and DL repetitions. In other words, an UL repetition (or DL repetition) may be scheduled to cross a slot boundary, and a DL repetition (or UL repetition) may be scheduled to not cross a slot boundary. Any transmission across slot boundary may be scheduled as one repetition with no gap in between. That is, as shown in FIG. 9B, at least one repetition may be scheduled for the DL or UL transmission (or both). As described, a repetition may be scheduled across the slot boundary 910, in some implementations. Thus, the repetition for the DL or UL transmission may be configured as a single repetitions 912, as shown.

In some aspects, the UL transmission or the DL transmission may be transmitted using HD mode. In some aspects, the UL transmission and the DL transmission may be transmitted using FD mode. When using FD mode scheduling, a joint repetition split may be configured for the DL and UL transmission such that beams are paired per repetition. In other words, when the repetitions of the DL and UL transmissions are full-duplexed (e.g., transmitted simultaneously using FD mode), a beam pair configured for FD mode may be used for the repetitions. The UE may receive the DL repetition of the DL transmission using a first beam of the beam pair, and transmit the UL repetition of the UL transmission using a second beam of the beam pair.

In some aspects, the message 902 may schedule a first quantity of repetitions of the DL transmission and a second quantity of repetitions of the UL transmission, the first quantity of repetitions being different (or the same) than the second quantity of repetitions.

Moreover, the message 902 may schedule a first duration for the repetition of the DL transmission and a second duration for the repetition of the UL transmission, the first duration being different (or the same) than the second duration. In other words, the repetitions for slot aggregation or sub-slot repetitions for DL and UL transmissions may be configured/scheduled to have different repetition numbers (e.g., quantity of repetitions), different durations, or both. The DL transmission may have four repetitions, and the UL transmission may have 2 repetitions. As another example, per repetition, the repetition for the DL transmission may occupy 4 symbols and the repetition for the UL transmission may occupy 6 symbols.

Figure 10:
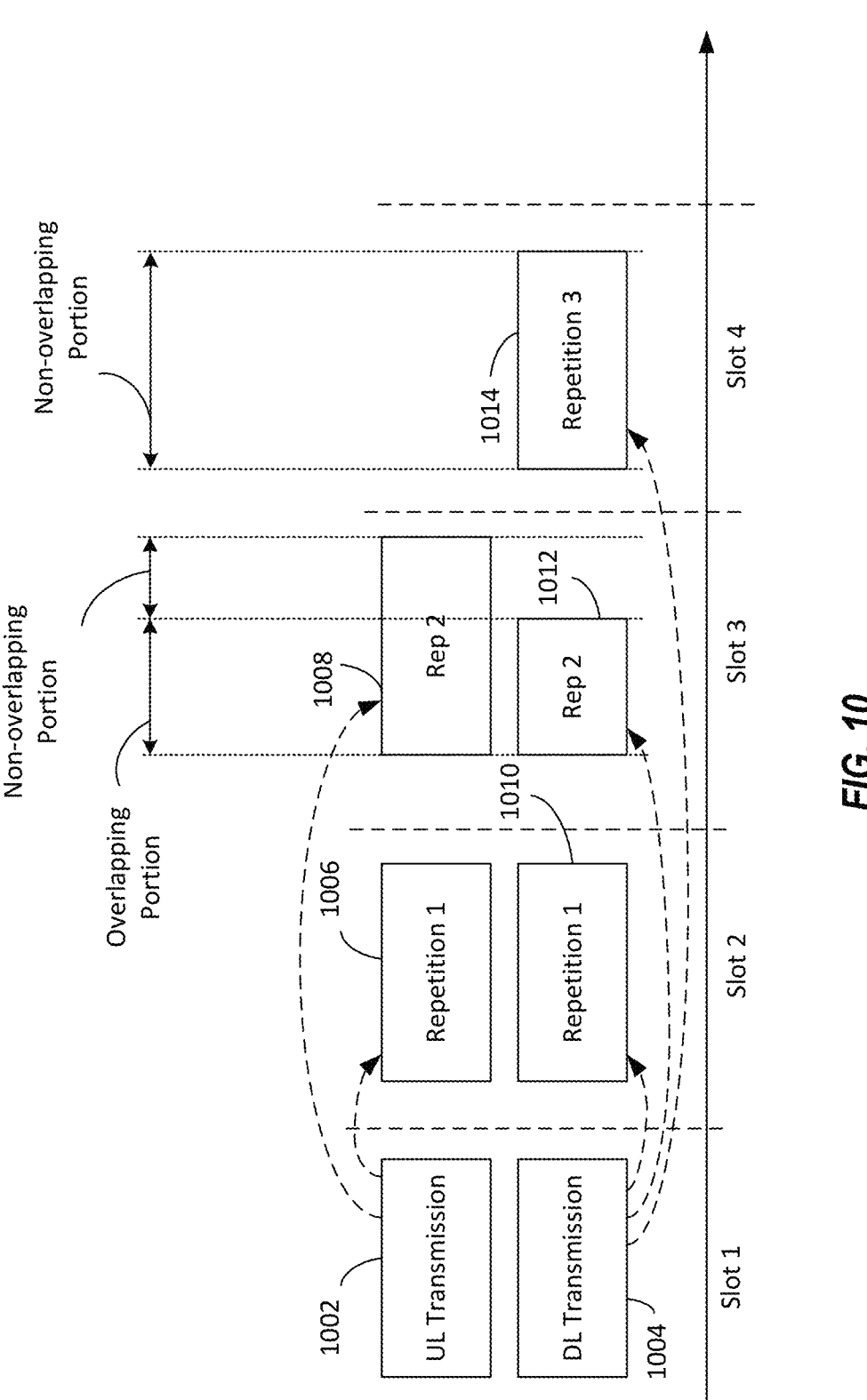
FIG. 10 illustrates repetitions for an uplink transmission and a downlink transmission, in accordance with certain aspects of the present disclosure.

FIG. 10 illustrates repetitions for an UL transmission 1002 and a DL transmission 1004, in accordance with certain aspects of the present disclosure.

As shown, the UL transmission may be scheduled with a different number (e.g., quantity) of repetitions than the DL transmission. For example, the UL transmission 1002 may have two repetitions 1006, 1008 (e.g., repetition 1 and repetition 2), and the DL transmission 1004 may have three repetitions 1010, 1012, 1014 (e.g., repetition 1, repetition 2, and repetition 3). Moreover, the repetitions may have different durations (e.g., occupy a different quantity of symbols). For example, repetition 1008 may have a longer duration than repetition 1012.

In some aspects, scheduling rules regarding pairing DL and UL beams for the DL and UL transmission repetitions may only apply to the overlapped repetition numbers and/or durations. In other aspects, the scheduling rules regarding pairing DL and UL beams for the DL and UL transmission repetitions may apply to all repetition numbers and/or durations.

For example, as shown, a portion of at least one repetition for the DL transmission (or the UL transmission) may be overlapping with a repetition for the UL transmission (or the DL transmission) in the time domain, and a portion of at least one repetition for the DL transmission (or the UL transmission) may be non-overlapping with a repetition for the UL transmission (or the DL transmission) in the time domain, as shown.

In some aspects, the UE may communicate the repetitions for the UL and DL transmissions during the overlapping portions using a configured beam pair for FD mode. In some aspects, the UE may continue to use a corresponding beam of the beam pair for transmission of a repetition during the non-overlapping portion, or may select a different beam to use for the repetition. In other words, the repetitions 1008 and 1012 may be transmitted using the beam pair during the overlapping portion, and repetition 1008 may continue to use a corresponding beam of the beam pair during the non-overlapping portion, or may select a different beam.

In some aspects, for repetitions, the DL transmission may be a dynamic physical downlink shared channel (PDSCH) or semi-persistent scheduling (SPS) transmission, and the UL transmission may be a dynamic PUSCH or configured grant (CG) transmission. In other words, the UL transmission 1002 may be a PDSCH or PUSCH scheduled using DCI, or an SPS transmission or CG transmission preconfigured using RRC signaling.

For CG, either DCI or RRC signaling may be used to activate/release the configured transmissions (e.g., the UL transmission 1002). For SPS, DCI may be used to activate/release the transmissions (e.g., the DL transmission 1004). For both SPS and CG, repetitions may be configured per SPS/CG occasion. In other words, RRC signaling may be used to configure multiple SPS or CG occasions, and the repetition for the SPS or CG transmissions may be configured for each SPS or CG occasion separately.

Example Wireless Communication Devices

Figure 11:
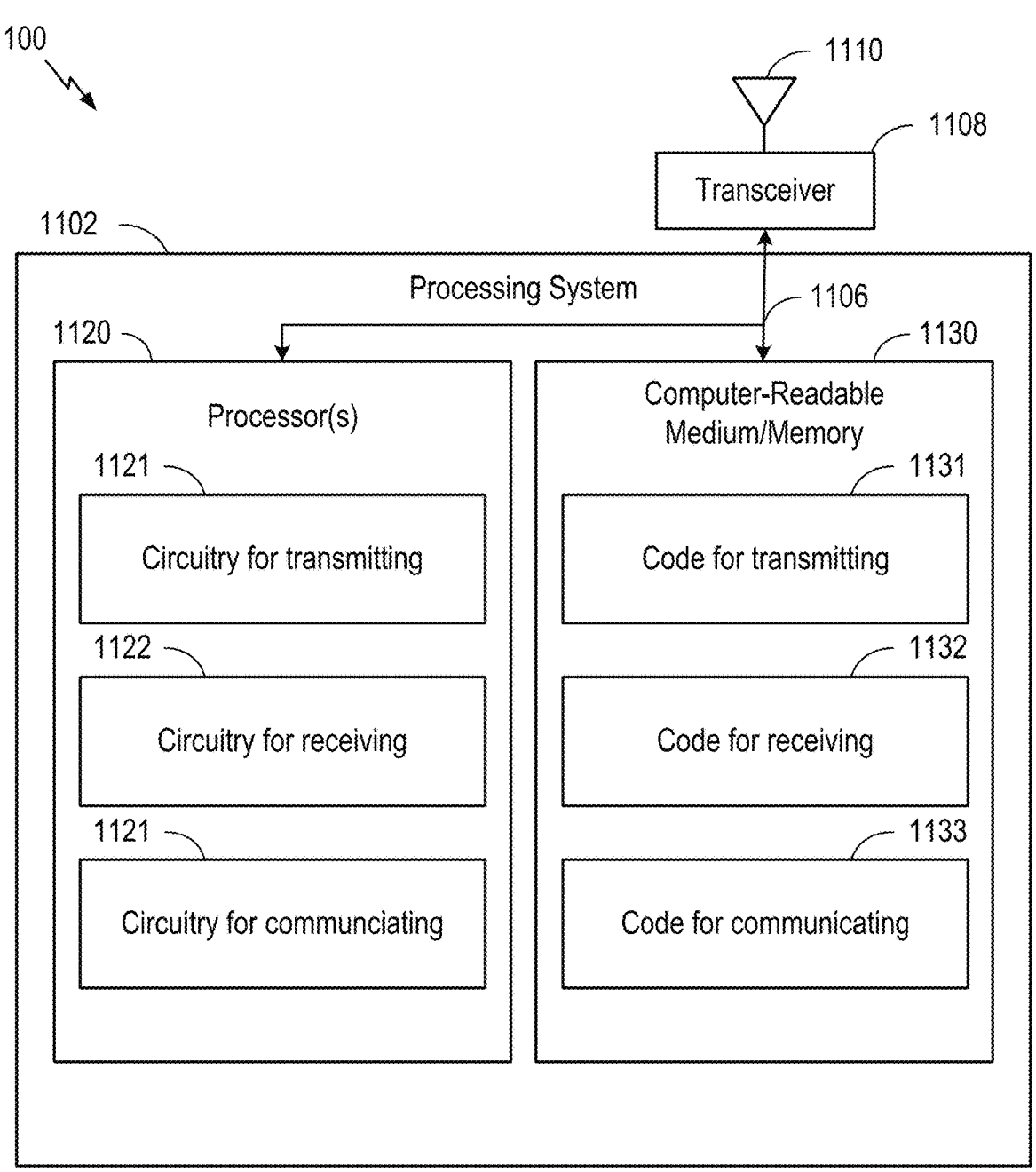
FIGS. 11 and 12 depict aspects of example communications devices.

FIG. 11 depicts an example communications device 1100 that includes various components operable, configured, or adapted to perform operations for the techniques disclosed herein, such as the operations depicted and described with respect to FIGS. 7 and 9-10. In some examples, communication device 1100 may be a base station 102 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIGS. 7 and 9-10, or other operations for performing the various techniques discussed herein for repetition.

In the depicted example, computer-readable medium/memory 1130 stores code 1131 for transmitting; code 1132 for receiving; and code 1133 for communicating.

In the depicted example, the one or more processors 1120 include circuitry configured to implement the code stored in the computer-readable medium/memory 1130, including circuitry 1121 for transmitting; circuitry 1122 for receiving; and circuitry 1123 for communicating.

Various components of communications device 1100 may provide means for performing the methods described herein, including with respect to FIGS. 7 and 9-10.

In some examples, means for transmitting or sending (or means for outputting for transmission) may include the transceivers 232 and/or antenna(s) 234 of the base station 102 illustrated in FIG. 2 and/or transceiver 1108 and antenna 1110 of the communication device 1100 in FIG. 11.

In some examples, means for receiving (or means for obtaining) may include the transceivers 232 and/or antenna(s) 234 of the base station illustrated in FIG. 2 and/or transceiver 1108 and antenna 1110 of the communication device 1100 in FIG. 11.

In some examples, means for transmitting, means for receiving, and means for communicating may include various processing system components, such as: the one or more processors 1120 in FIG. 11, or aspects of the base station 102 depicted in FIG. 2, including receive processor 238, transmit processor 220, TX MIMO processor 230, and/or controller/processor 240 (including repetition component 241).

Notably, FIG. 11 is just use example, and many other examples and configurations of communication device 1100 are possible.

Figure 12:
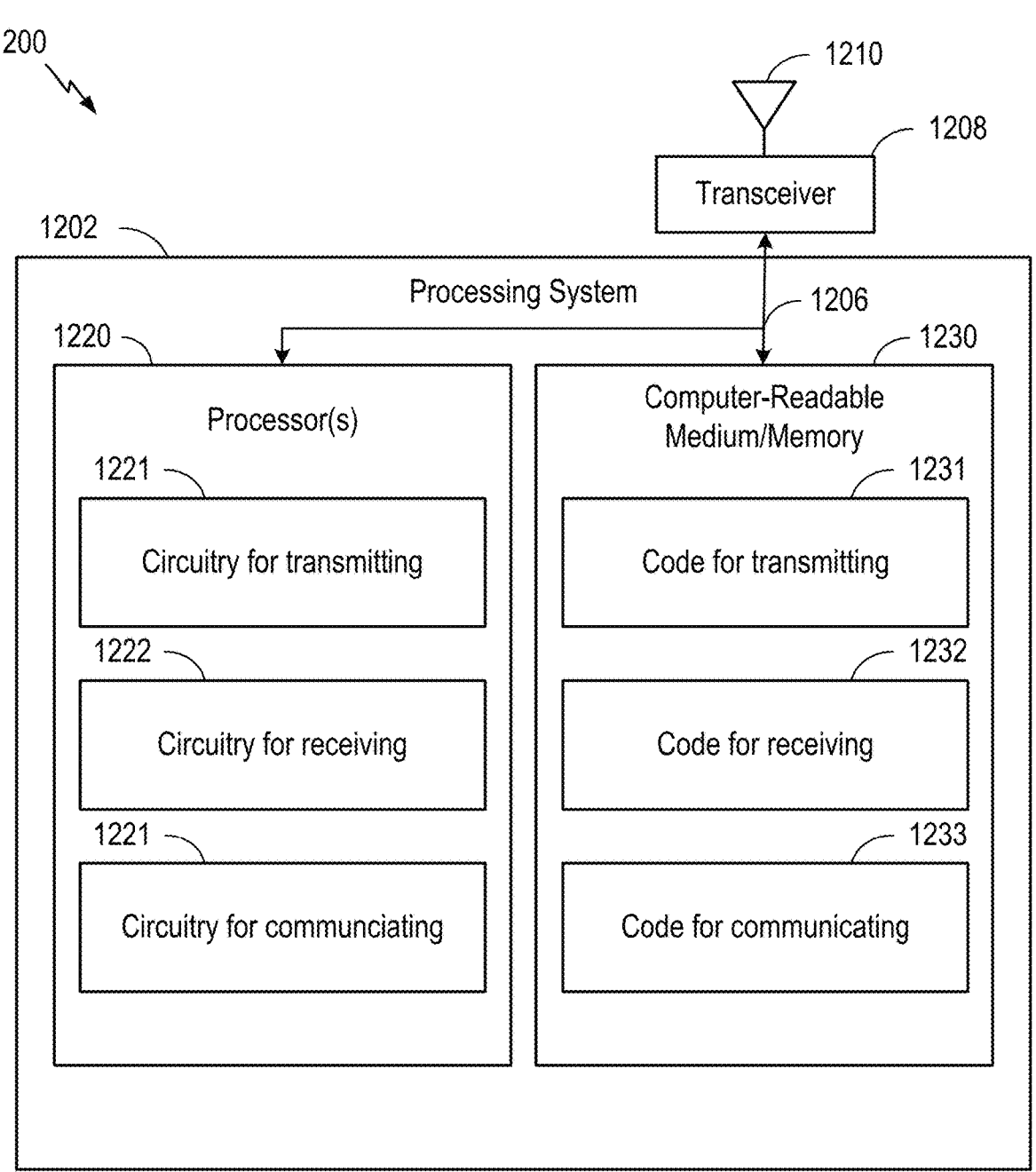

FIG. 12 depicts an example communications device 1200 that includes various components operable, configured, or adapted to perform operations for the techniques disclosed herein, such as the operations depicted and described with respect to FIGS. 8 and 9-10. In some examples, communication device 1200 may be a user equipment 104 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIGS. 8 and 9-10, or other operations for performing the various techniques discussed herein for repetition.

In the depicted example, computer-readable medium/memory 1230 stores code 1231 for transmitting; code 1232 for receiving; and code 1233 for communicating.

In the depicted example, the one or more processors 1220 include circuitry configured to implement the code stored in the computer-readable medium/memory 1230, including circuitry 1221 for transmitting; circuitry 122 for receiving; and circuitry for communicating Various components of communications device 1200 may provide means for performing the methods described herein, including with respect to FIGS. 8 and 9-10.

In some examples, means for transmitting or sending (or means for outputting for transmission) may include the transceivers 254 and/or antenna(s) 252 of the user equipment 104 illustrated in FIG. 2 and/or transceiver 1208 and antenna 1210 of the communication device 1200 in FIG. 12.

In some examples, means for receiving (or means for obtaining) may include the transceivers 254 and/or antenna(s) 252 of the user equipment 104 illustrated in FIG. 2 and/or transceiver 1208 and antenna 1210 of the communication device 1200 in FIG. 12.

In some examples, means for transmitting, means for receiving, and means for communicating may include various processing system components, such as: the one or more processors 1220 in FIG. 12, or aspects of the user equipment 104 depicted in FIG. 2, including receive processor 258, transmit processor 264, TX MIMO processor 266, and/or controller/processor 280 (including repetition component 281).

Notably, FIG. 12 is just use example, and many other examples and configurations of communication device 1200 are possible.

Example Clauses

Implementation examples are described in the following numbered clauses:

Clause 1. A method for wireless communication by a user-equipment (UE), comprising: receiving a message scheduling a downlink (DL) transmission and an uplink (UL) transmission and a repetition of at least one of the DL transmission or the UL transmission; and communicating with at least one wireless node in accordance with the scheduling by the message.

Clause 2. The method of clause 1, wherein the message indicates that the repetition of at least one of the DL transmission or the UL transmission spans across a slot boundary.

Clause 3. The method of any one of clauses 1-2, wherein the message indicates that the repetition of at least one of the DL transmission or the UL transmission does not span across a slot boundary.

Clause 4. The method of any one of clauses 1-3, wherein the message indicates that the repetition for one of the DL and UL transmissions spans across a slot boundary and indicates that the repetition for another one of the DL or UL transmissions does not span across the slot boundary.

Clause 5. The method of any one of clauses 1-4, wherein: the communicating further comprises simultaneously communicating the repetition of the DL transmission and the repetition of the UL transmission using full-duplex (FD) communication, and the message indicates that both the repetitions of the DL and UL transmissions span across a boundary between slots or that both the repetitions of the DL and UL transmissions do not span across the boundary between the slots.

Clause 6. The method of clause 5, wherein the communicating further comprises communicating the repetitions for the DL transmission and the UL transmission using an UL and DL beam pair configured for the FD communication.

Clause 7. The method of any one of clauses 1-6, wherein the communicating further comprises communicating at least one of the DL transmission or the UL transmission using full-duplex (FD) communication.

Clause 8. The method of any one of clauses 1-7, wherein the communicating further comprises communicating at least one of the DL transmission or the UL transmission using half-duplex (HD) communication.

Clause 9. The method of any one of clauses 1-8, wherein the message schedules a first quantity of repetitions of the DL transmission and a second quantity of repetitions of the UL transmission, the first quantity of repetitions being different than the second quantity of repetitions.

Clause 10. The method of any one of clauses 1-9, wherein the message schedules a first duration for the repetition of the DL transmission and a second duration for the repetition of the UL transmission, the first duration being different than the second duration.

Clause 11. The method of any one of clauses 1-10, wherein: the repetition of the DL transmission is part of one or more repetitions of the DL transmission, the repetition of the UL transmission is part of one or more repetitions of the UL transmission, a first portion of the one or more repetitions of one of the DL and UL transmissions is overlapping with the one or more repetitions of another one of the DL and UL transmissions, and the one or more repetitions of the DL and UL transmissions use an UL and DL beam pair configured for FD communication during the first portion of the one or more repetitions.

Clause 12. The method of clause 11, wherein: a second portion of the one or more repetitions of the one of the DL and UL transmissions is non-overlapping with the one or more repetitions of the other one of the DL and UL transmissions, and the one or more repetitions of DL transmission or the UL transmission uses a beam of the UL and DL beam pair during the second portion.

Clause 13. The method of any one of clauses 11-12, wherein: a second portion of the one or more repetitions of the one of the DL and UL transmissions is non-overlapping with the one or more repetitions of the other one of the DL and UL transmissions, and the one or more repetitions of DL transmission or the UL transmission uses a beam different than the UL and DL beam pair during the second portion.

Clause 14. The method of any one of clauses 1-13, wherein at least one of the DL transmission or the UL transmission comprises: a physical downlink shared channel (PDSCH); a physical uplink shared channel (PUSCH); a semi-persistent scheduling (SPS) transmission; or a configured grant (CG) transmission.

Clause 15. The method of any one of clauses 1-14, wherein the message comprises downlink control information (DCI) or a radio resource control (RRC) message.

Clause 16. A method for wireless communication by a base station (BS), comprising: transmitting a message scheduling a downlink (DL) transmission and an uplink (UL) transmission and a repetition of at least one of the DL transmission or the UL transmission; and communicating with a user-equipment (UE) in accordance with the scheduling by the message.

Clause 17. The method of clause 16, wherein the message indicates that the repetition of at least one of the DL transmission or the UL transmission spans across a slot boundary.

Clause 18. The method of any one of clauses 16-17, wherein the message indicates that the repetition of at least one of the DL transmission or the UL transmission does not span across a slot boundary.

Clause 19. The method of any one of clauses 16-18, wherein the message indicates that the repetition for one of the DL and UL transmissions spans across a slot boundary and indicates that the repetition for another one of the DL or UL transmissions does not span across the slot boundary.

Clause 20. The method of any one of clauses 16-19, wherein: the communicating further comprises simultaneously communicating the repetition of the DL transmission and the repetition of the UL transmission using full-duplex (FD) communication, and the message indicates that both the repetitions of the DL and UL transmissions span across a boundary between slots or that both the repetitions of the DL and UL transmissions do not span across the boundary between the slots.

Clause 21. The method of clause 20, wherein the communicating further comprises communicating the repetitions for the DL transmission and the UL transmission using an UL and DL beam pair configured for the FD communication.

Clause 22. The method of any one of clauses 16-21, wherein the communicating further comprises communicating at least one of the DL transmission or the UL transmission using full-duplex (FD) communication.

Clause 23. The method of any one of clauses 16-22, wherein the communicating further comprises communicating at least one of the DL transmission or the UL transmission using half-duplex (HD) communication.

Clause 24. The method of any one of clauses 16-23, wherein the message schedules a first quantity of repetitions of the DL transmission and a second quantity of repetitions of the UL transmission, the first quantity of repetitions being different than the second quantity of repetitions.

Clause 25. The method of any one of clauses 16-24, wherein the message schedules a first duration for the repetition of the DL transmission and a second duration for the repetition of the UL transmission, the first duration being different than the second duration.

Clause 26. The method of any one of clauses 16-25, wherein: the repetition of the DL transmission is part of one or more repetitions of the DL transmission, the repetition of the UL transmission is part of one or more repetitions of the UL transmission, a first portion of the one or more repetitions of one of the DL and UL transmissions is overlapping with the one or more repetitions of another one of the DL and UL transmissions, and the one or more repetitions of the DL and UL transmissions use an UL and DL beam pair configured for FD communication during the first portion of the one or more repetitions.

Clause 27. The method of clause 26, wherein: a second portion of the one or more repetitions of the one of the DL and UL transmissions is non-overlapping with the one or more repetitions of the other one of the DL and UL transmissions, and the one or more repetitions of DL transmission or the UL transmission uses a beam of the UL and DL beam pair during the second portion.

Clause 28. The method of any one of clauses 26-27, wherein: a second portion of the one or more repetitions of the one of the DL and UL transmissions is non-overlapping with the one or more repetitions of the other one of the DL and UL transmissions, and the one or more repetitions of DL transmission or the UL transmission uses a beam different than the UL and DL beam pair during the second portion.

Clause 29: An apparatus, comprising: a memory comprising executable instructions; one or more processors configured to execute the executable instructions and cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by one or more processors of an apparatus, cause the apparatus to perform a method in accordance with any one of Clauses 1-28.

Clause 32: A computer program product embodied on a computer-readable storage medium comprising code for performing a method in accordance with any one of Clauses 1-28.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mm-Wave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/ duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/ symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of techniques for channel repetition in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication by a user-equipment (UE), comprising:

memory coupled to one or more processors, wherein the one or more processors are configured to cause the apparatus to:

receive a message scheduling a downlink (DL) transmission, an uplink (UL) transmission, and a plurality of repetitions of the DL transmission and the UL transmission; and communicate the plurality of repetitions of the DL transmission and the UL transmission, the plurality of repetitions including at least a repetition of the DL transmission and a repetition of the UL transmission communicated via full-duplex (FD) communication with at least one wireless node in accordance with the scheduling by the message, wherein:

a first portion of the plurality of repetitions of one of the DL transmission or the UL transmission is overlapping in time with the plurality of repetitions of another one of the DL transmission or the UL transmission, the plurality of repetitions of the DL and UL transmissions are communicated, during the first portion of the plurality of repetitions, via an UL and DL beam pair configured for FD communication, a second portion of the plurality of repetitions of the one of the DL transmission or the UL transmission is non-overlapping in time with the plurality of repetitions of the another one of the DL transmission or the UL transmission, the plurality of repetitions of the DL transmission or the UL transmission are communicated, during the second portion of the plurality of repetitions, via a different beam than the UL and DL beam pair used during the first portion of the plurality of repetitions, and the message indicates that at least one of the repetition of the DL transmission or the repetition of the UL transmission spans across a boundary between consecutive slots and occupies one or more symbols in each of the consecutive slots.

2. The apparatus of claim 1, wherein the one or more processors are configured to cause the apparatus to:

determine the UL and DL beam pair configured for the FD communication; and communicate the repetition for the DL transmission via a first beam of the UL and DL beam pair and the repetition for the UL transmission via a second beam of the UL and DL beam pair.

3. The apparatus of claim 1, wherein the message schedules a first quantity of repetitions of the DL transmission and a second quantity of repetitions of the UL transmission, the first quantity of repetitions being different than the second quantity of repetitions.

4. The apparatus of claim 1, wherein at least one of the DL transmission or the UL transmission comprises:

a physical downlink shared channel (PDSCH);

a physical uplink shared channel (PUSCH);

a semi-persistent scheduling (SPS) transmission; or a configured grant (CG) transmission.

5. The apparatus of claim 1, wherein the message comprises downlink control information (DCI) or a radio resource control (RRC) message.

6. The apparatus of claim 1, wherein the message indicates that each of the plurality of repetitions of the DL transmission and each of the plurality of repetitions of the UL transmission spans across the boundary between the consecutive slots.

7. The apparatus of claim 1, wherein the message indicates that at least one of the plurality of repetitions of the DL transmission and at least one of the plurality of repetitions of the UL transmission does not span across the boundary between the consecutive slots.

8. The apparatus of claim 1, wherein:

the message schedules a first plurality of symbols for each of the plurality of repetitions of the DL transmission and a second plurality of symbols for each of the plurality of repetitions of the UL transmission, and a quantity of the first plurality of symbols scheduled for each of the plurality of repetitions of the DL transmission is different from a quantity of the second plurality of symbols scheduled for each of the plurality of repetitions of the UL transmission.

9. An apparatus for wireless communication by a base station (BS), comprising:

memory coupled to one or more processors, wherein the one or more processors are configured to cause the apparatus to:

transmit a message scheduling a downlink (DL) transmission, an uplink (UL) transmission, and a plurality of repetitions of the DL transmission and the UL transmission; and communicate the plurality of repetitions of the DL transmission and the UL transmission, the plurality of repetitions including at least a repetition of the DL transmission and a repetition of the UL transmission communicated via full-duplex (FD) communication with a user-equipment (UE) in accordance with the scheduling by the message, wherein:

a first portion of the plurality of repetitions of one of the DL transmission or the UL transmission is overlapping in time with the plurality of repetitions of another one of the DL transmission or the UL transmission, the plurality of repetitions of the DL and UL transmissions are communicated, during the first portion of the plurality of repetitions, via an UL and DL beam pair configured for FD communication, a second portion of the plurality of repetitions of the one of the DL transmission or the UL transmission is non-overlapping in time with the plurality of repetitions of the another one of the DL transmission or the UL transmission, the plurality of repetitions of the DL transmission or the UL transmission are communicated, during the second portion of the plurality of repetitions, via a different beam than the UL and DL beam pair used during the first portion of the plurality of repetitions, and the message indicates that at least one of the repetition of the DL transmission or the repetition of the UL transmission spans across a boundary between consecutive slots and occupies one or more symbols in each of the consecutive slots.

10. The apparatus of claim 9, wherein the one or more processors are configured to cause the apparatus to communicate the repetition for the DL transmission and the repetition for the UL transmission via the UL and DL beam pair configured for the FD communication.

11. The apparatus of claim 9, wherein the message schedules a first quantity of repetitions of the DL transmission and a second quantity of repetitions of the UL transmission, the first quantity of repetitions being different than the second quantity of repetitions.

12. The apparatus of claim 9, wherein the message indicates that each of the plurality of repetitions of the DL transmission and each of the plurality of repetitions of the UL transmission spans across the boundary between the consecutive slots.

13. The apparatus of claim 9, wherein the message indicates that at least one of the plurality of repetitions of the DL transmission and at least one of the plurality of repetitions of the UL transmission does not span across the boundary between the consecutive slots.

14. The apparatus of claim 9, wherein:

the message schedules a first plurality of symbols for each of the plurality of repetitions of the DL transmission and a second plurality of symbols for each of the plurality of repetitions of the UL transmission, and a quantity of the first plurality of symbols scheduled for each of the plurality of repetitions of the DL transmission is different from a quantity of the second plurality of symbols scheduled for each of the plurality of repetitions of the UL transmission.

15. A method for wireless communication by a user-equipment (UE), comprising:

receiving a message scheduling a downlink (DL) transmission, an uplink (UL) transmission, and a plurality of repetitions of the DL transmission and the UL transmission; and communicating the plurality of the DL transmission and the UL transmission, the plurality of repetitions including a repetition of the DL transmission and a repetition of the UL transmission communicated via full-duplex (FD) communication with at least one wireless node in accordance with the scheduling by the message, wherein:

a first portion of the plurality of repetitions of one of the DL transmission or the UL transmission is overlapping in time with the plurality of repetitions of another one of the DL transmission or the UL transmission, the plurality of repetitions of the DL and UL transmissions are communicated, during the first portion of the plurality of repetitions, via an UL and DL beam pair configured for FD communication, a second portion of the plurality of repetitions of the one of the DL transmission or the UL transmission is non-overlapping in time with the plurality of repetitions of the another one of the DL transmission or the UL transmission, the plurality of repetitions of the DL transmission or the UL transmission are communicated, during the second portion of the plurality of repetitions, via a different beam than the UL and DL beam pair used during the first portion of the plurality of repetitions, and the message indicates that at least one of the repetition of the DL transmission or the repetition of the UL transmission spans across a boundary between consecutive slots and occupies one or more symbols in each of the consecutive slots.

16. The method of claim 15, wherein the message indicates that each of the plurality of repetitions of the DL transmission and each of the plurality of repetitions of the UL transmission spans across the boundary between the consecutive slots.

17. The method of claim 15, wherein the message indicates that at least one of the plurality of repetitions of the DL transmission and at least one of the plurality of repetitions of the UL transmission does not span across the boundary between the consecutive slots.

18. The method of claim 15, wherein:

the message schedules a first plurality of symbols for each of the plurality of repetitions of the DL transmission and a second plurality of symbols for each of the plurality of repetitions of the UL transmission, and a quantity of the first plurality of symbols scheduled for each of the plurality of repetitions of the DL transmission is different from a quantity of the second plurality of symbols scheduled for each of the plurality of repetitions of the UL transmission.

19. A method for wireless communication by a base station (BS), comprising:

transmitting a message scheduling a downlink (DL) transmission, an uplink (UL) transmission, and a plurality of repetitions of the DL transmission and the UL transmission; and communicating the plurality of repetitions of the DL transmission and the UL transmission, the plurality of repetitions including a repetition of the DL transmission and a repetition of the UL transmission communicated via full-duplex (FD) communication with a user equipment (UE) in accordance with the scheduling by the message, wherein:

a first portion of the plurality of repetitions of one of the DL transmission or the UL transmission is overlapping in time with the plurality of repetitions of another one of the DL transmission or the UL transmission, the plurality of repetitions of the DL and UL transmissions are communicated, during the first portion of the plurality of repetitions, via an UL and DL beam pair configured for FD communication, a second portion of the plurality of repetitions of the one of the DL transmission or the UL transmission is non-overlapping in time with the plurality of repetitions of the another one of the DL transmission or the UL transmission, the plurality of repetitions of the DL transmission or the UL transmission are communicated, during the second portion of the plurality of repetitions, via a different beam than the UL and DL beam pair used during the first portion of the plurality of repetitions, and the message indicates that at least one of the repetition of the DL transmission or the repetition of the UL transmission spans across a boundary between consecutive slots and occupies one or more symbols in each of the consecutive slots.

20. The method of claim 19, wherein the message indicates that each of the plurality of repetitions of the DL transmission and each of the plurality of repetitions of the UL transmission spans across the boundary between the consecutive slots.

21. The method of claim 19, wherein the message indicates that at least one of the plurality of repetitions of the DL transmission and at least one of the plurality of repetitions of the UL transmission does not span across the boundary between the consecutive slots.

22. The method of claim 19, wherein:

the message schedules a first plurality of symbols for each of the plurality of repetitions of the DL transmission and a second plurality of symbols for each of the plurality of repetitions of the UL transmission, and a quantity of the first plurality of symbols scheduled for each of the plurality of repetitions of the DL transmission is different from a quantity of the second plurality of symbols scheduled for each of the plurality of repetitions of the UL transmission.

* * * * *